United States Patent [19]
Dewald

[11] Patent Number: 5,517,855
[45] Date of Patent: May 21, 1996

[54] COMBINED WATER METER

[75] Inventor: Hans-Peter Dewald, Mannheim, Germany

[73] Assignee: H. Meinecke Aktiengesellschaft, Germany

[21] Appl. No.: 216,700

[22] Filed: Mar. 23, 1994

[51] Int. Cl.$^6$ ........................................... G01F 7/00
[52] U.S. Cl. ........................................... 73/197
[58] Field of Search ........................... 73/197, 198, 203, 73/249

[56] References Cited

U.S. PATENT DOCUMENTS

| | | | |
|---|---|---|---|
| 3,453,884 | 7/1969 | Mary | 73/197 |
| 3,707,872 | 1/1973 | Masson et al. | 73/197 X |
| 4,175,434 | 11/1979 | Bradham, III et al. | 73/197 |
| 4,217,929 | 8/1980 | Pelt | 73/197 X |
| 4,429,571 | 2/1984 | Kullmann et al. | 73/197 |
| 5,088,322 | 2/1992 | Fitzpatrick et al. | 73/197 |
| 5,117,856 | 6/1992 | Kim et al. | 73/197 X |
| 5,257,537 | 11/1993 | Bianchi | 73/197 |

FOREIGN PATENT DOCUMENTS

| | | |
|---|---|---|
| 92631 | 6/1896 | Germany . |
| 1077884 | 5/1962 | Germany . |
| 3034056 | 4/1982 | Germany . |
| 3929381 | 3/1991 | Germany . |

*Primary Examiner*—Richard Chilcot
*Assistant Examiner*—Elizabeth L. Dougherty
*Attorney, Agent, or Firm*—Ostrolenk, Faber, Gerb & Soffen

[57] ABSTRACT

An automatically acting switch valve for a combined water meter which has a main meter for measuring larger flows and a secondary meter for measuring smaller flows. The switch valve has a switch insert including a carrier with a central slide bolt fastened to it, a shut-off member displaceably guided on the bolt and urged into closed position by a spring, a sealing seat of greatly narrowed cross section provided with an elastic seal between the carrier and the shut-off member. An annular chamber receives the shut-off member and opens downstream. It has a cylindrical zone and an adjoining same a conically narrowing annular zone which terminates in a narrowed shut-off member retention step. The shut-off member has a disk-shaped rim the front part of which is contained, in the closed position of the valve, within the cylindrical zone of the annular chamber. The dimensions are so adapted to each other that the seal only frees the main-stream passage when the disk rim of the shut-off member moves up into the conically narrowed annular zone under the pressure of the water. Due to the construction of the invention, a weak, short restoring spring is required so that the switch valve can be made small and compact.

20 Claims, 5 Drawing Sheets

COMBINED WATER METER

BACKGROUND OF THE INVENTION

The present invention relates to combined water meters having a main meter for measuring larger flows, an automatically acting switch valve arranged following the main meter, a secondary meter in a secondary line or secondary channel for measuring smaller flows, and an outlet from the secondary line or channel which debouches laterally into the housing of the switch valve.

Combined water meters and automatically acting switch valves which serve for switching between a main meter and a secondary meter were used in the nineteenth century. They include a valve disk including a surface which is larger than the surface of the sealing seat of the main water stream. As a result, the differential water pressure acts on a smaller surface in a blocked passage and on a larger surface in an open passage in order to abruptly open the valve disk. In order to counterbalance for the differential water pressure when the valve disk is closed, suitable means are employed, for instance, gravity, spring force, etc. It is desired that the valve disk open and close in each case as suddenly as possible so that no errors in measurement will occur.

For example, in Federal Republic of Germany C-92 631, the valve disk is seated within a guide cylinder which is arranged after the valve seat. The annular slot between the rim of the valve disk and the wall of the cylinder is kept as narrow as possible. This construction, however, cannot produce the desired sudden lift off of the valve disk because after the slightest lifting of the valve disk from its sealing seat, pressure equalization occurs which reduces the difference in pressure. The equalization is produced via the unavoidable annular slot, which, with constant flow, causes the valve disk to stop within the region of the cylinder and thus causes a too slight flow through the main meter. Accordingly, large measurement errors occur with this construction, upon both the opening and the closing of the valve.

Federal Republic of Germany C-10 77 884 which was published in 1960, discloses an improved switch valve for combined meters. It operates with a swing flap which is equipped with a protruding rim which engages into an annular space into which the secondary stream coming from the secondary meter is introduced. The swing flap is held in a closed position by a weight which is arranged so that a reduction in the closing force is obtained upon the opening of the flap. This change in the closing force in combination with the pushing action of the secondary stream on the rim of the flap accelerates the opening process but decelerates the closing process. As a whole, however, this reduces the errors in measurement during the switching. These switch valves can be mounted only in a well defined position. Furthermore, they are extremely large and heavy, making them completely unsuitable for the so called short structural length preferred today.

In about 1980, switch valves were defined for combined water meters having a valve disk which moves linearly against a spring as described in Federal Republic of Germany C-30 34 056. The valves have a double sealing seat and require a fine control hole for their operation. The valve disk also has a widened rim which extends into an annular space into which the secondary stream enters. In this way, the secondary stream pushes in the opening direction, and this push must be counteracted by a suitably strengthened closure spring. These switch valves produce an error in measurement, even though a slight one, in the switching region. Dirt, rust or lime in the water can interfere with the dependable operation of the switch valve and increase the errors in measurement.

All switch valves having a closure spring have one problem in common. The restoring force of the spring increases linearly with an increasing path of opening of the valve disk. The ideal, however, would be a constant or even a decreasing restoring force, as is present in the above mentioned weight loaded flap valves. Spring loaded switch valves must therefore be provided with a spring which is as long as possible in order to keep the increase in force slight. This, however, runs counter to the so-called short construction length which is preferred today.

Federal Republic of Germany A-39 29 391 discloses a switch valve for combined water meters which uses a permanent magnet in order to exert an additional holding force on the disk in its closed position. This enables the restoring spring to be made correspondingly weaker and/or shorter. Furthermore, this switch valve has a lip seal which, upon the start of the opening stroke of the valve disk, initially still remains "sticking" on the sealing seat and the seal tears off only when the holding action of the permanent magnet is overcome. The use of permanent magnets in switch valves is, however, rejected by most users since it is feared that particles of rust which are suspended in the water will be attracted and interfere with the operation. Furthermore, it has been found that the lip seal in combination with the protruding rim of the valve disk produces an additional push in the direction of opening, which must be compensated for by increased magnet and/or spring force.

SUMMARY OF THE INVENTION

The object of the present invention is to provide a combined meter of the aforementioned type which is constructed so that all hydraulic and other forces acting on the valve disk in the opening direction are reduced to a minimum or are completely eliminated, so that the spring which holds the valve disk in its closed position can be minimally weak and/or short.

The invention relates to an automatically acting switch valve useful for a combined water meter which has a main meter for measuring larger water glows and a secondary meter for measuring small water flows. The switch valve includes a switch insert, the movement of which determines whether the larger flow moves through the switch valve. The switch insert comprises a carrier which remains stationary with the valve housing and which is shaped for having both the larger and smaller flows move past it. A central slide bolt is fastened to the stationary carrier and extends from the carrier downstream toward the outlet from the valve. A shut-off member is displaceable guided on the bolt. A spring urges the shut-off member into a closed position against a sealing seat on the insert. There is an elastic seal between the carrier and the shut-off member. The shut-off member is received within an annular chamber which includes a cylindrical zone followed in the downstream flow direction by a conically narrowed zone which terminates in a narrowed retention step. The shut-off member is disc-like with at least a part thereof that remains within the cylindrical zone of the annular chamber when the shut-off member is in the valve closed position. The disc and cylindrical and conical zones are respectively so dimensioned that the elastic seal only opens the mainstream passage for the larger water flow when the disc rim of the shut-off member has been moved up into the conically narrowed annular zone under the water pressure and pressure differential between the larger and smaller flows moving toward the valve. Either the valve shut-off member itself is so shaped to cooperate with the respective water flows or additional means are provided that the restoring spring need not provide the only force that holds the shut-off member against the sealing seat to block the main flow. As a result, a weak and/or short restoring spring is required on the shut-off member so that the switch valve can be made small and compact.

Due to the strong narrowing of the sealing seat of the main stream, only a slight opening pressure acts on the shut-off member. This makes it possible to use a weak or short spring. The high pressure loss normally present with such a strong narrowing of the cross section of flow is avoided by the long inlet funnel. Because the annular chamber wall narrows down conically in a downstream direction, this assures that the forces of flow acting on the shut off member increase continuously after the main stream passage opens, so that the edge of the shut-off member abruptly overcomes, so to speak, the retention step, while upon the closing of the main stream passage, after overcoming the retention step, the forces of flow decrease, also continuously, so that the shut-off member closes abruptly.

In an embodiment of the invention in which the secondary stream is introduced into the annular chamber which receives the shut-off member, the introduction takes place via control slits in a separate slit zone which is located between the cylindrical zone and the conical zone of the annular chamber. This assures that the forces of flow released by the secondary stream act on the shut-off member in the opening direction, only after the latter has completed a well defined initial stroke and the differential water pressure has exceeded a given minimum value.

In another embodiment of the invention in which the secondary stream is conducted into the valve housing after the switch valve, it is advisable to use a control valve in the secondary line or channel, which valve strongly throttles the secondary stream as soon as the amount of its flow exceeds a given amount. This exerts a pressure pulse on the shut-off member and pushes the rim of the shut-off member through the cylindrical zone of the annular chamber up into its conical zone, whereupon the forces of flow abruptly push the shut-off member open as already described.

Other features and advantages of the present invention will become apparent from the following description of the invention which refers to the accompanying drawings.

DETAILED DESCRIPTION OF THE INVENTION

Figure 1:
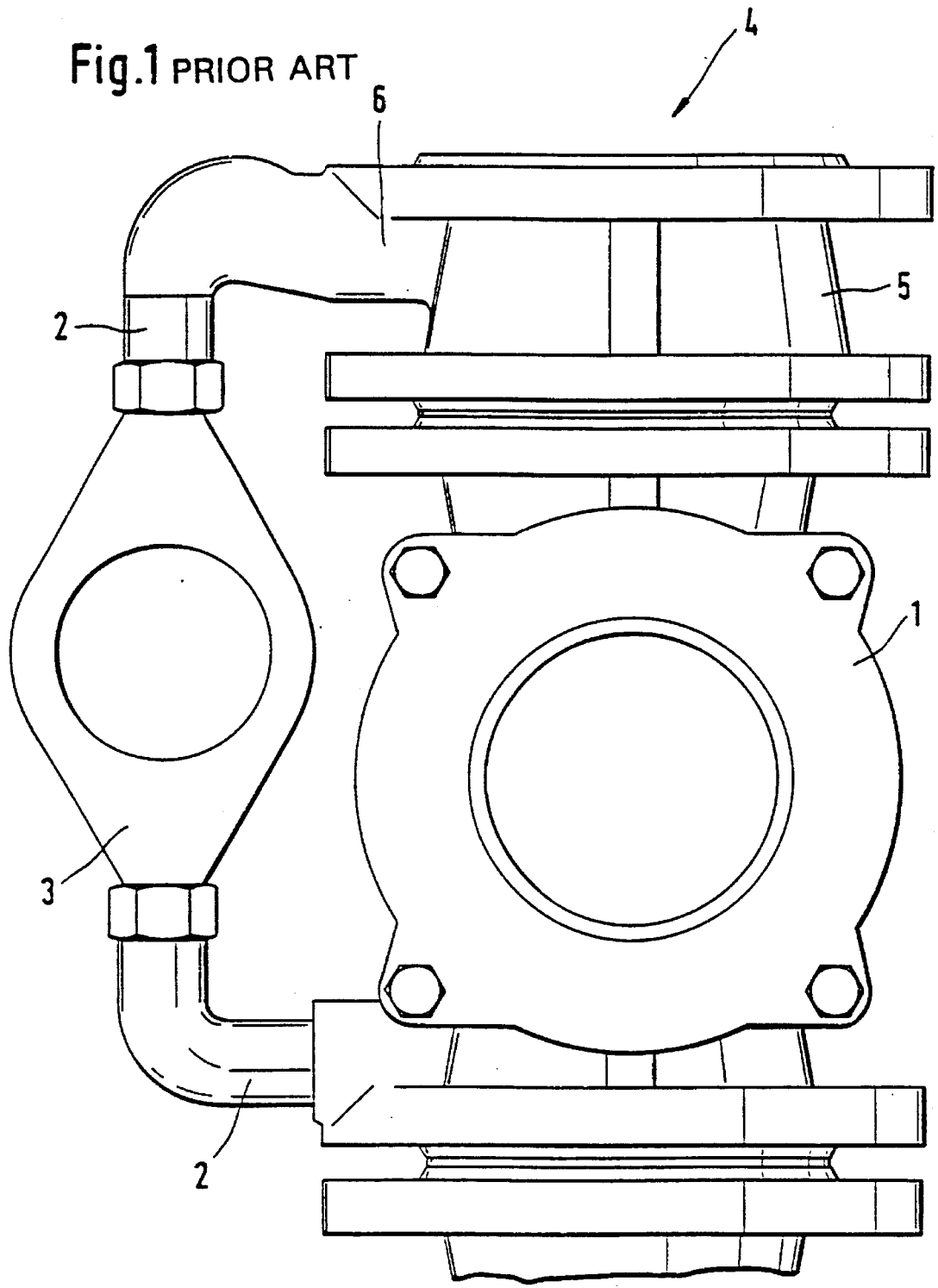
FIG. 1 is a diagrammatic top view of a combined water meter of short structural length.

FIG. 1 diagrammatically shows a combined water meter comprised essentially of a main meter 1, a secondary meter 3, and a secondary line 2 having an outlet 6 which discharges into the housing 5 of a switch valve 4. All parts are screwed together and sealed from each other. The switch valve 4 has extremely short structural length.

Figure 2:
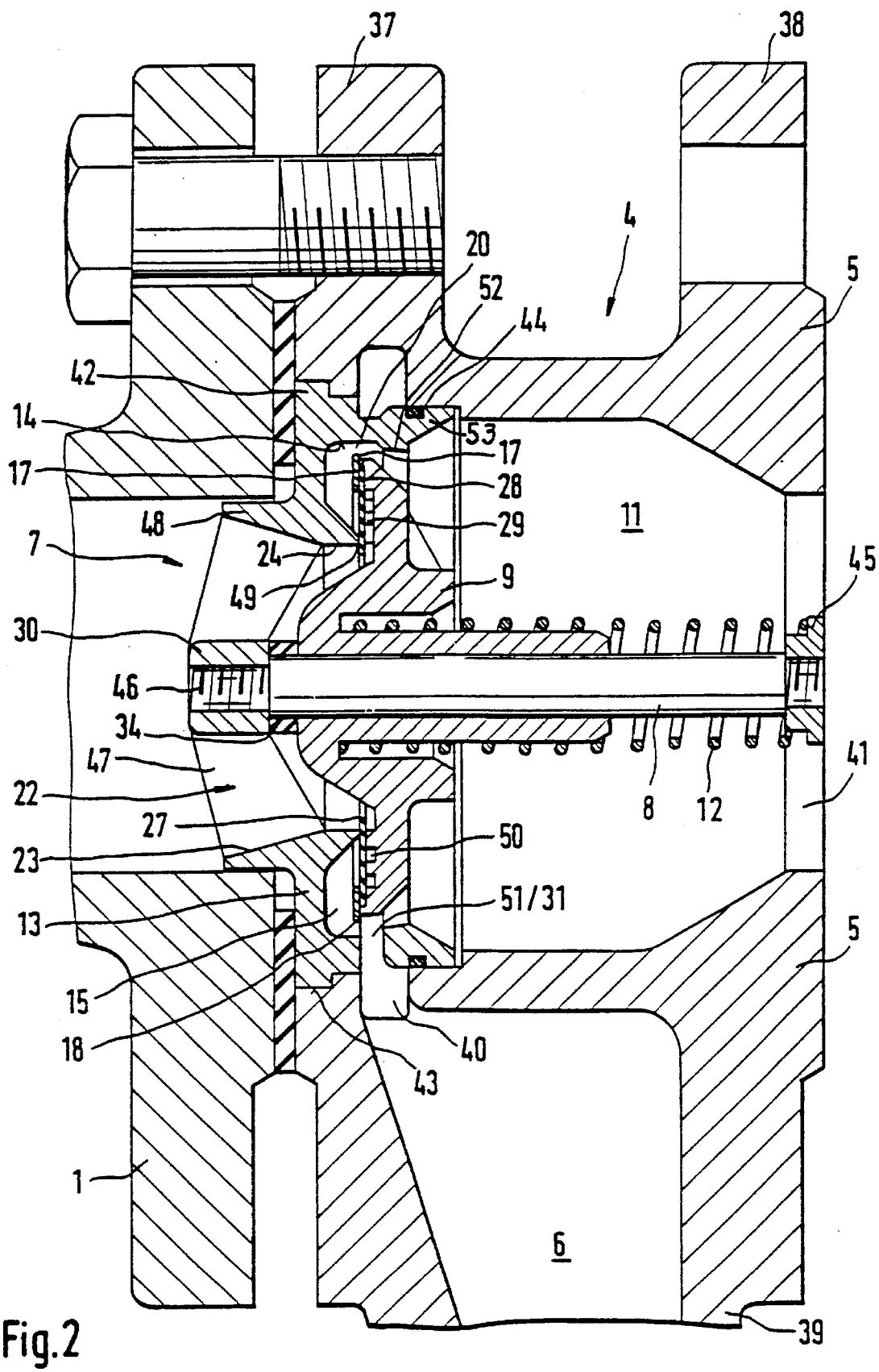
FIG. 2 is a longitudinal section through a switch valve in closed position, in which the secondary stream is conducted into the switch insert.

FIG. 2 shows, on a larger scale, a longitudinal section through a first embodiment of a switch valve 4. It has a valve housing 5 with inlet flange 37, outlet flange 38, and connecting socket 39 for the secondary line 2. The water coming from the secondary meter 3 flows via a secondary channel 2 from a lateral side into a central annular channel 40 of the valve housing 5. Within the housing 5 there is seated a compact switch insert 7 which is guided by its fitting ring 42 in a housing fitting 43 and is sealed with respect to the housing rear part 11 by means of an O-ring 44.

The switch insert 7 comprises a switch insert carrier 13 having a front part 46 formed with a hub 30 onto which there is screwed or molded a central slide bolt 8. Support ribs 47 connect the central hub 30 with an outer ring 48. On the slide bolt 8, there is seated a longitudinally movable shut-off member 9 having an annular lip seal 27, a prestressed compression spring 12, and a clamping nut 45. Furthermore, a packing 34 is provided against which the shut-off member 9 rests.

The outer part 28 of the lip seal 27 is clamped on the annular disk rim 17 of the shut-off member 9. When the valve is closed, the inner part 29 of the lip seal 27 is pressed via a labyrinth-like support 50 and by the compression spring 12 firmly against an annular sealing edge 49 of the switch insert carrier 13.

In front of the sealing edge 49 there is an inlet funnel 23 which is as long and flat as possible in order to reduce the pressure loss which the water experiences upon passage through the cross section of the main-stream flow zone 22 as the zone 22 is greatly constricted as compared with the nominal cross section of the valve. A reduction in area of 30 to 40% is typical. With maximum flow of water, the pressure loss, in accordance with certain weights and measures regulations, must not exceed 0.5 bar, for example.

The switch insert carrier 7 furthermore has an annular chamber 15 with a cylindrical zone 14, a slit zone 51, and a conical retention step 52 which adjoins the zone 51 downstream past the conical retention step, the annular chamber widens again in a short axial length outlet funnel 53, which in cooperation with the inlet funnel 23 acts in effect as a venturi tube. The disk-shaped rim 17 of the shut-off member 9 is free of force and contact with any force applying means in the cylindrical zone 14 when the valve is closed. The cylindrical zone 14 can therefore also be referred to as a neutral zone.

The secondary meter water flowing into the central annular channel 40 flows in through control slits 31 in the slit zone 51 and through the conical retention step 52 and the outlet funnel 53 to the rear part 11 of the valve housing 5, and departs the rear part via the housing outlet 41 in order to flow to a water removal point, not shown. The control slits 31 are considerably narrower than the annular channel 40.

Controlling of the opening and closing of the shut-off member 9 is by the outer edge 18 of the disk rim 17, the slit zone 51, the conical retention step 52 and the outlet funnel 53 and the lip seal 27. They act together as follows upon the opening of the shut-off member 9:

With the valve closed, the water to be measured flows through the secondary line 2, is measured in the secondary meter 3, and then flows through the passage 6 and the connection socket 39 into the annular channel 40 of the valve housing 5. From there, it passes through the control slits 31 and out of the channel 40 through the conical retention step 52 and the outlet funnel 53 and into the housing rear part 11. In this connection, a pressure drop takes place of about 0.2 to 0.4 bar. In the housing rear space 11, a lower pressure prevails than in the main meter 1. This pressure differential acts in the opening direction on the shut-off member 9 which is presently sealed on the sealing edge 49. The compression spring 12, however, initially keeps the shut-off member 9 closed, acting against the pressure differential.

If the pressure difference increases further with the flow through the secondary line 2, then the shut-off member 9 starts to move against the force of the compression spring 12. At this time, the elastic lip seal 27 still remains closed. The disk rim 17 of the shut-off member 9, however, slides through the neutral zone 14, 15 up to about the center of the slit zone 51. Here, the entering secondary stream strikes the disk rim 17 and pushes it further into the conical retention step 52. At this step, the narrow annular slot 20 between disk rim 17 and annular chamber wall 29 decreases continuously. Therefore, the disk rim 17 is pushed in each case past the end of the retention step 52. At this time, the lip seal 27 tears off the sealing edge 49 enabling the main quantity of the water to flow through the main meter 1 and the main stream flow zone 22. This opening process takes place very rapidly so that errors in measurement do not occur.

As a result of the dynamic pressure occurring behind, i.e. after the conical retention step 52 i.e. in the outlet funnel 53, the retention step acts as a hydraulic detent. The shut-off member 9 is therefore at first prevented from moving back.

Figure 3:
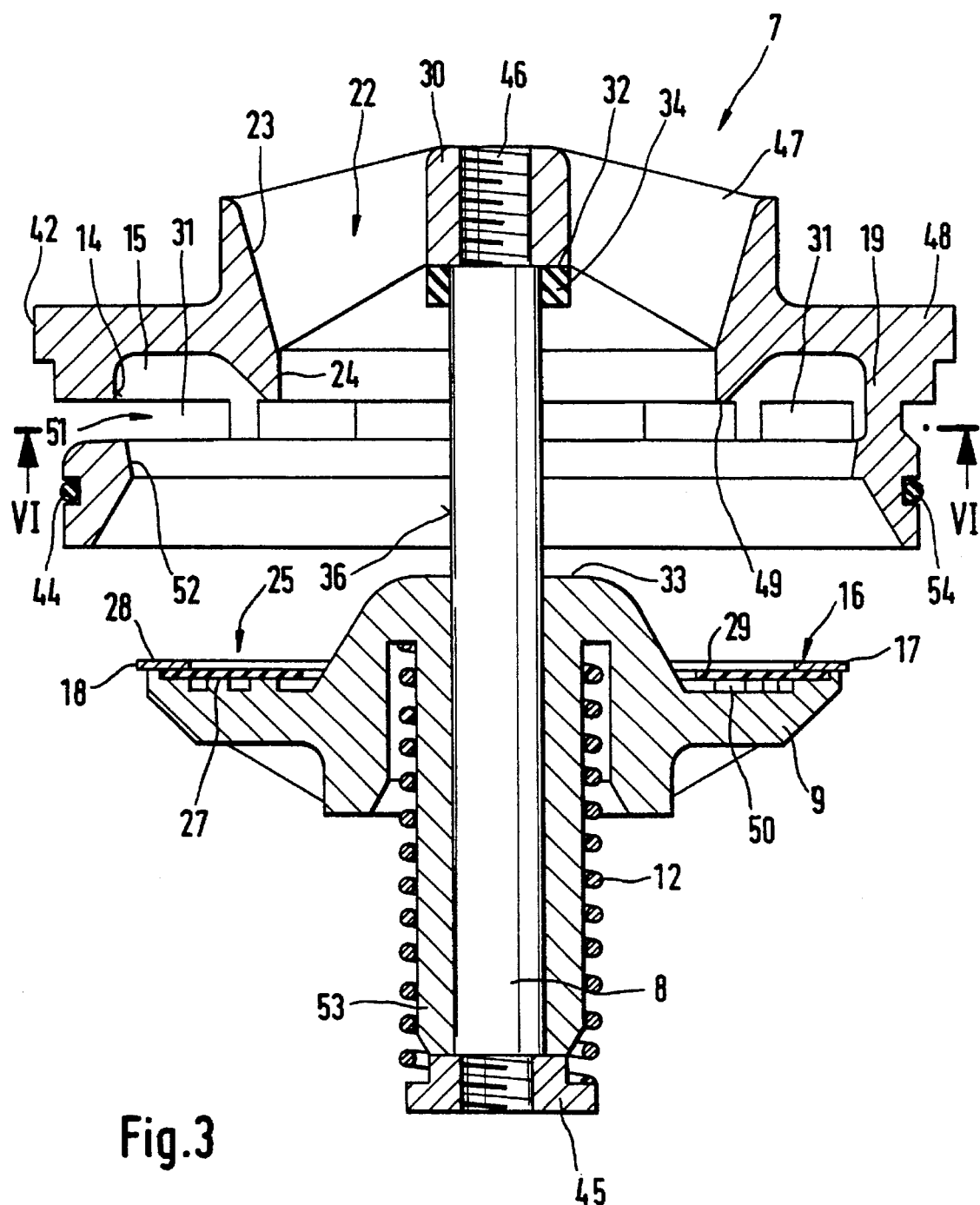
FIG. 3 shows the switch insert of FIG. 2 in its maximum open position.

If the water flow continues to increase, the shut-off member 9 is pushed by the water passing through, against the resistance of the compression spring 12, along the slide bolt 8 and further downstream until member 9 reaches its end position (FIG. 3).

Closing of the switch valve takes place in the reverse sequence. Upon a decrease in the flow through the main stream 22, the shut-off member 9 slides upstream due to the closing force of the compression spring 12, out of the end position of the member 9 until it comes against the retention step 52. The shut-off member 9 remains standing here until the water flow decreases to such an extent that the force of the compression spring 12 can overcome the dynamic resistance of the hydraulic detent. The shut-off member 9 then slides, without delay, back into its closed position, and the continuous widening of the annular gap 20 accelerates the closing movement. The main-stream flow 22 is thus suddenly closed off. The water now flows only through the secondary meter 3.

FIG. 3 shows the switch insert 7 of FIG. 2 on a larger scale and with the shut-off member 9 open the maximum amount. Its hub 53 rests against the spring clamping nut 45.

Figure 4:
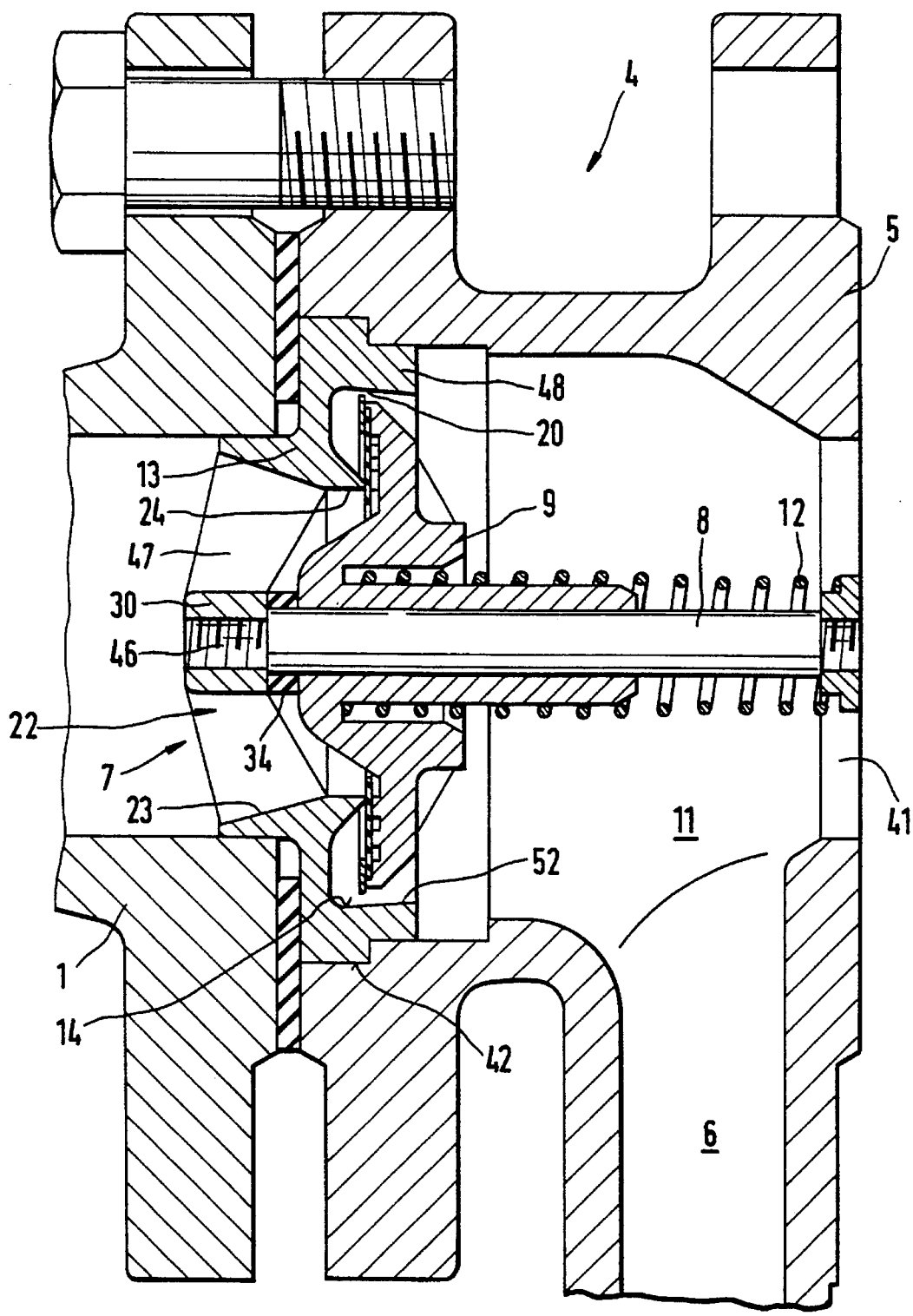
FIG. 4 is a longitudinal section through another switch valve in closed position in which the secondary stream discharges directly into the valve housing.

FIG. 4 shows a longitudinal section through another switch valve 4. In this case, the output 6 of the secondary line 2 debouches behind the switch valve insert 7 into the valve housing 5. Therefore, there is neither a central annular channel 40 nor a slit zone 51 or an outlet funnel like 53. The inlet funnel 23 is present. The outer ring 48 with the fitting ring 42 of the switch insert carrier 13 has been structurally changed. The control necessary for the opening and closing of the shut-off member 9 is taken over here by an ordinary control valve, arranged in the secondary line, which greatly throttles the secondary line 2 when a given amount of flow is exceeded.

Figure 5:
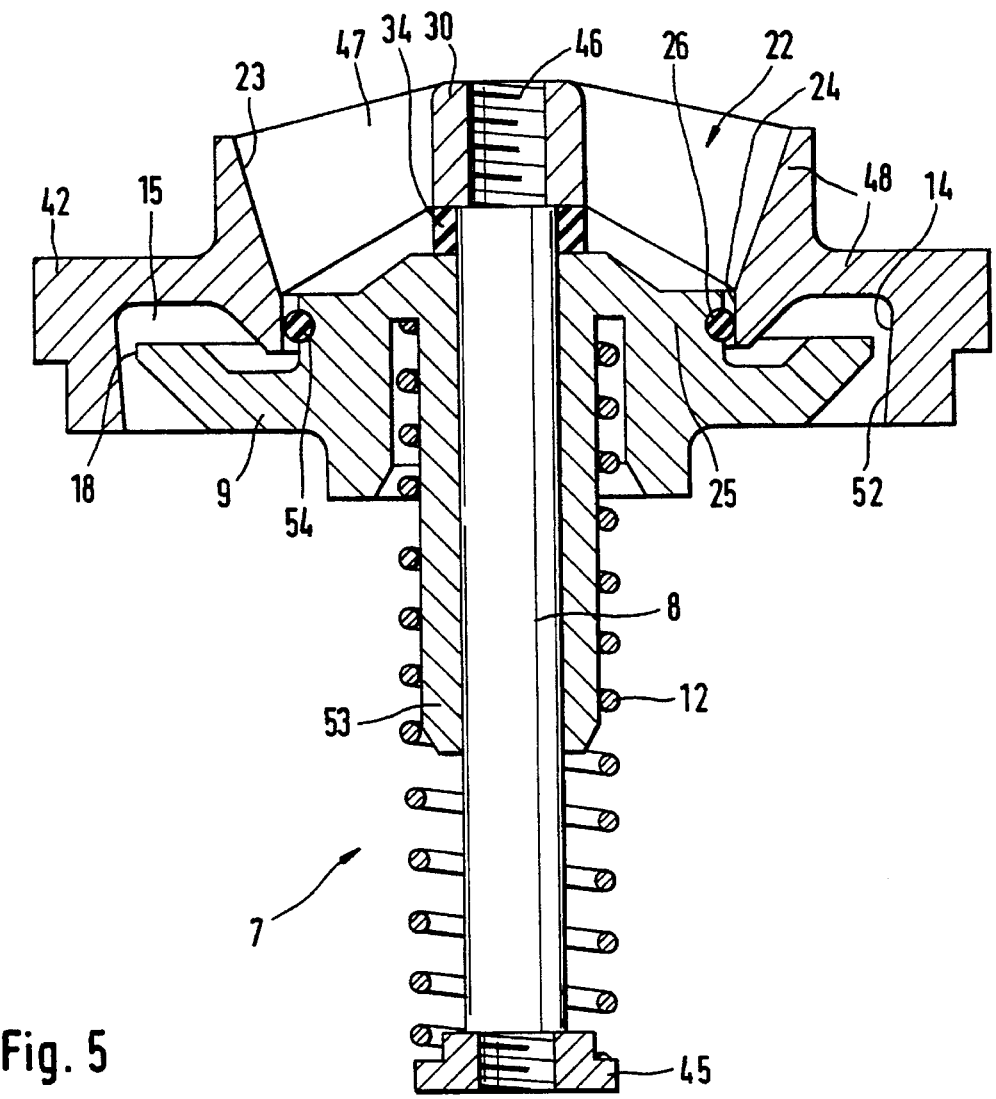
FIG. 5 shows the switch insert of FIG. 4, but with an O-ring as a seal on the shut-off member.

FIG. 5 shows a modified switch insert 7 in which the main-stream flow zone 22 is sealed off by an O-ring 26. The latter is clamped firmly in an annular groove 54 on the shut-off member 9. In order that the shut-off member 9 can carry out a certain initial stroke without the main-stream passage being opened, a cylindrical sealing-seat passage 24 is present on the end of the long inlet funnel 23. This passage should be as short as possible so that the pressure loss in the greatly narrowed main-stream flow zone does not increase impermissibly.

Figure 6:
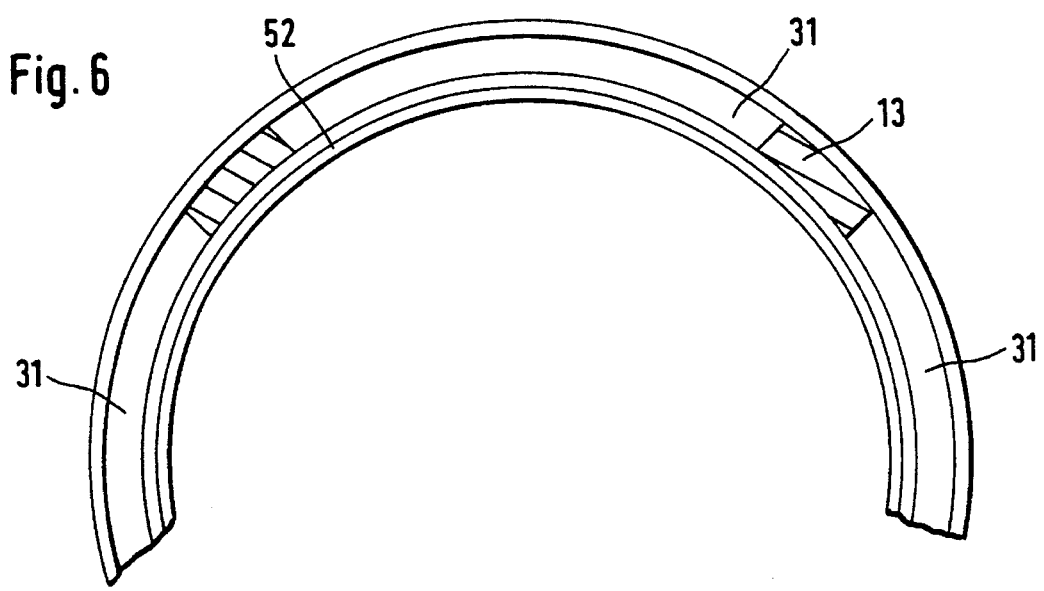
FIG. 6 is a cross section through the switch insert carrier of FIG. 3, seen in the region of the slit zone.

FIG. 6, finally, shows a portion of a cross section along the line VI—VI through the switch valve of FIG. 3 in the region of the slit zone 51. The switch insert carrier 13 can be noted in section as well as the control slits 31 and the conical retention step 52.

Despite all differences between the embodiments in FIGS. 2, 4 and 5, the features which are responsible for the optimal function of the switch valve 4 are common to them. There are concerned in this connection the strongly narrowed main-stream flow zone 20 for reducing the spring force or for shortening the spring 12, the long inlet funnel 23 for reducing the pressure loss, the consequent avoidance of all further pressure and flow forces which could move the shut-off member 9 when it is present in the neutral zone 4 in the opening direction, and the conical retention step 52 which assures that the shut-off member 9 can be either only entirely in the annular chamber 15 or only entirely outside of it. The sum of these features leads to a switch valve 4 which is of extremely short construction, which has only a single sealing seat, which is very simple, economical and dependable in operation, does not require any accessories or personnel for opening and closing, and which reduces any possible errors in measurement within the switch region to an absolute minimum.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A combined water meter including:

a main meter for measuring larger water flow, an automatically acting switch valve connected with the main meter for receiving flow therefrom; the switch valve having a housing;

a secondary channel having an inlet and having a secondary meter therein for measuring smaller water flows, the secondary channel having an outlet into the switch valve housing;

a passage through the switch valve housing from an inlet communicating with the main meter to an outlet from the passage;

a switch insert in the passage of the switch valve housing, the switch insert comprising an annular carrier supported in the housing and across the passage and the annular shape of the carrier defining an open area surrounded by the carrier and permitting flow past the carrier; a central slide bolt supported on the carrier and extending along the passage;

a shut-off member displacably supported and guided on the slide bolt; a spring connected with and urging the shut-off member in a closing direction toward the passage inlet; a sealing seat on the carrier; an elastic seal on the shut-off member and engagable with the sealing seat on the carrier, such that with the shut-off member on the sealing seat, flow through the passage from the inlet to the outlet is blocked;

the shut-off member having a generally disc shaped rim which is outward of the engagement between the shut-off member and the sealing seat;

the carrier and the shut-off member being respectively shaped to define an annular chamber in the passage around the rim of the shut-off member and inside the annular carrier, the carrier and the rim of the shut-off member being respectively so sized and shaped that the annular chamber is shaped to have a cylindrical zone around the rim of the shut-off member when the shut-off member is on the sealing seat and for a distance of movement of the rim away from the sealing seat, and so that the annular chamber is shaped to narrow conically in the downstream direction downstream of the annular chamber and toward the outlet from the passage, narrowing the annular slot between the rim of the shut-off member and the annular chamber as the shut-off member moves away from the sealing seat and toward the passage outlet, defining thereby a narrowed retention step for the shut-off member; the disc-shaped rim of the shut-off member having a front part which is located within the cylindrical zone of the annular chamber in the valve closed position with the shut-off member on the sealing seat;

upstream of the sealing seat in the flow path of water through the passage, the passage and the carrier being so shaped as to define an inlet funnel which tapers down in the downstream direction toward the sealing seat so as to be narrowed as compared with the inlet to the passage;

the secondary channel entering the valve housing at a location downstream of the sealing seat with respect to the flow path through the main passage.

2. The water meter of claim 1, wherein the carrier includes the annular chamber and the conically tapering narrowed chamber which defines the retention step.

3. The water meter of claim 2, wherein the carrier and the shut-off member are respectively injection molded plastic elements.

4. The water meter of claim 1, wherein the carrier extends across the passage and has water flow passages through it permitting flow of water past the carrier;

the carrier including a hub, the slide bolt being attached to the hub and extending in the downstream direction through the passage from the hub.

5. The water meter of claim 4, further comprising sealing surfaces cooperating with each other on the downstream side of the hub and the upstream side of the shut-off member.

6. The water meter of claim 5, further comprising an elastic seal on the slide bolt and between the downstream side of the hub and the upstream side of the shut-off member.

7. The water meter of claim 6, further comprising a sealing lip on the upstream side of the seal.

8. The water meter of claim 1, further comprising the inlet funnel having a short length cylindrical section just upstream of the sealing seat.

9. The water meter of claim 8, wherein the sealing seat comprises a sealing element upstream of the shut-off member and placed so as to retain the seal between the shut-off member and the carrier for part of the opening movement of the shut-off member of the valve until beyond a predetermined opening stroke of the shut-off member.

10. The water meter of claim 9, wherein the sealing element comprises an O-ring supported on and moveable with the shut-off member and disposed in the cylindrical portion of the inlet funnel, the diameter of the O-ring being selected to seal off the passage through the inlet funnel for a predetermined stroke of the shut-off member.

11. The water meter of claim 10, wherein the shut-off member includes an annular groove and the O-ring is supported in the annular groove so that the O-ring moves with the shut-off member.

12. The water meter of claim 1, further comprising an annular lip seal supported on the shut-off member, the lip seal including a radially outer rim which is securely fastened on the shut-off member and a radially inner rim which is the portion of the shut-off member that engages the sealing seat on the carrier, the lip seal being elastic, and the inner rim thereof bending in the axial direction to retain the lip seal against the sealing seat for a predetermined opening stroke of the shut-off member away from the carrier, an the inner rim separating from the sealing seat after the predetermined opening stroke of the shut-off member.

13. The water meter of claim 12, further comprising a labyrinth-like resting surface on the shut-off member on which the lip seal is supported.

14. The water meter of claim 1, wherein the carrier includes a slit zone between the cylindrical and the conically narrowing retention step zone; the slit zone comprising control slits through the carrier communicating with the secondary channel so that the secondary water stream flows into the annular chamber through the slit zone, the slit zone communicating with the annual chamber such that the upstream side of the disc-shaped rim of the shut-off member in the cylindrical zone with the shut-off member on the sealing seat is not acted on by the secondary stream passing the slit zone.

15. The water meter of claim 14, wherein the slit zone is short in axial length.

16. The water meter of claims 14, further comprising an annular channel in the housing which is open toward the slits of the slit zone.

17. The water meter of claim 1, wherein the secondary channel communicates into the passage downstream of the shut-off member when the shut-off member is seated on the sealing seat;

a control valve in the secondary channel for controlling the flow through the secondary channel, thereby for controlling the pressure of the main flow and secondary flow on the shut-off members.

18. The water meter of claim 1, wherein the inlet funnel narrows such that the cross section of the passage at the sealing seat is reduced by at least 20% as compared with the cross section of the main passage at the inlet.

19. The water meter of claim 8, wherein the inlet funnel narrows such that the cross section of the passage at the sealing seat is reduced by at least 20% as compared with the cross section of the passage at the inlet.

20. The water meter of claim 1, wherein the carrier is shaped so that downstream of the cylindrical zone of the annular chamber, the annular chamber includes an outlet funnel which tapers wider in the downstream direction.

* * * * *